United States Patent
Prisament et al.

(10) Patent No.: US 11,498,211 B2
(45) Date of Patent: Nov. 15, 2022

(54) COMPOSABILITY FRAMEWORK FOR ROBOTIC CONTROL SYSTEM

(71) Applicant: Intrinsic Innovation LLC, Mountain View, CA (US)

(72) Inventors: Gregory J. Prisament, East Palo Alto, CA (US); Michael Beardsworth, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 142 days.

(21) Appl. No.: 16/730,871

(22) Filed: Dec. 30, 2019

(65) Prior Publication Data
US 2021/0197374 A1 Jul. 1, 2021

(51) Int. Cl.
*B25J 9/16* (2006.01)
*G06T 7/73* (2017.01)

(52) U.S. Cl.
CPC .......... *B25J 9/1661* (2013.01); *B25J 9/1658* (2013.01); *B25J 9/1697* (2013.01); *G06T 7/73* (2017.01)

(58) Field of Classification Search
USPC .................................................. 700/245–264
See application file for complete search history.

(56) References Cited

U.S. PATENT DOCUMENTS 7,590,680 B2 * 9/2009 Fernando ................ H04L 67/02
709/201
8,295,978 B2 * 10/2012 Cho ...................... G05D 1/0291
700/250

(Continued)

FOREIGN PATENT DOCUMENTS

WO WO-03045639 A2 * 6/2003 .............. B25J 9/161

OTHER PUBLICATIONS

McNaughton et al., "Broker: An Interprocess Communication Solution for Multi-Robot Systems" 2005 IEEE/RSJ International Conference on Intelligent Robots and Systems, Aug. 2005, 6 pages (Year: 2005).*

(Continued)

*Primary Examiner* — Jonathan L Sample
(74) *Attorney, Agent, or Firm* — Fish & Richardson P.C.

(57) ABSTRACT

Methods, systems, and apparatus, including computer programs encoded on computer storage media, for a composability framework that supports the coordination of the low-level actions of multiple subsystems. One of the methods comprises receiving a multi-device application definition for a real-time robotic control system configured to perform operations comprising controlling a robotic execution environment having multiple robotic components, wherein the application definition comprises: one or more custom high-level software modules for each robotic component of the multiple robotic components; respective module interface definitions for each of the custom high-level software modules, wherein a module interface definition of a custom high-level software module specifies one or more asynchronous or real-time communication channels; and respective device interface definitions for each of the multiple robotic components; and processing the application definition to generate output programs to be executed respectively by the multiple robotic components.

20 Claims, 4 Drawing Sheets

(56) References Cited

U.S. PATENT DOCUMENTS

| | | | | |
|---|---|---|---|---|
| 8,639,644 | B1* | 1/2014 | Hickman | G06N 3/008 |
| | | | | 706/14 |
| 8,805,580 | B2* | 8/2014 | Kamioka | B25J 9/1602 |
| | | | | 901/1 |
| 8,832,647 | B2* | 9/2014 | Cope | G06F 8/71 |
| | | | | 717/123 |
| 9,114,528 | B2* | 8/2015 | Haag | B25J 9/161 |
| 9,390,284 | B1* | 7/2016 | Wang | G06F 21/6209 |
| 9,778,745 | B2* | 10/2017 | Braun | G06F 3/016 |
| 10,322,507 | B2* | 6/2019 | Meier | G05B 13/027 |
| 10,800,042 | B2* | 10/2020 | Skubch | B25J 9/1661 |
| 10,857,672 | B2* | 12/2020 | Lee | B25J 9/1602 |
| 10,901,812 | B2* | 1/2021 | Sathe | H04L 41/082 |
| 10,960,540 | B2* | 3/2021 | Dukatz | B25J 9/163 |
| 2003/0171846 | A1* | 9/2003 | Murray, IV | G05D 1/0088 |
| | | | | 700/258 |
| 2008/0141220 | A1* | 6/2008 | Kim | B25J 9/1661 |
| | | | | 901/50 |
| 2009/0082879 | A1* | 3/2009 | Dooley | G05D 1/0219 |
| | | | | 700/3 |
| 2009/0254217 | A1* | 10/2009 | Pack | G06N 3/008 |
| | | | | 700/246 |
| 2010/0179689 | A1* | 7/2010 | Lin | G05B 19/41865 |
| | | | | 700/250 |
| 2014/0074294 | A1* | 3/2014 | Wu | G05B 19/414 |
| | | | | 700/264 |
| 2014/0289698 | A1* | 9/2014 | Tanguy | G06F 8/73 |
| | | | | 717/104 |
| 2018/0256989 | A1* | 9/2018 | Adekunle | A63F 13/2145 |
| 2019/0080252 | A1* | 3/2019 | Shinn | G06F 9/4413 |
| 2020/0276707 | A1* | 9/2020 | Go | B25J 9/1689 |
| 2020/0344293 | A1* | 10/2020 | Wolter | G06F 8/60 |
| 2020/0348654 | A1* | 11/2020 | Anand | G05B 19/41865 |
| 2021/0197373 | A1* | 7/2021 | Cassero | B25J 9/1653 |

OTHER PUBLICATIONS

McNaughton et al., "Broker: An Interprocess Communication Solution for Multi-Robot Systems," 2005 IEEE/RSJ International Conference on Intelligent Robots and Systems, Aug. 2005, 6 pages.

PCT International Search Report and Written Opinion in International Appln. No. PCT/US2020/067334, dated Mar. 26, 2021, 16 pages.

Steele et al., "Ada and real-time robotics: lessons learned," Computer, Apr. 1994. 27(4):49-54.

github.com [online], "ros-infrastructure/robots.ros.org," May 8, 2016, retrieved on May 21, 2020, retrieved from URL <https://github.com/ros-infrastructure/robots.ros.org>, 2 pages.

kuka.com [online], "KUKA Sunrise.OS," available on or before Apr. 11, 2017, via Internet Archive: Wayback Machine URL <https://web.archive.org/web/20170411072912/https://www.kuka.com/en-us/products/robotics-systems/software/system-software/sunriseos>, retrieved on May 21, 2020, retrieved from URL <https://www.kuka.com/en-us/products/robotics-systems/software/system-software/sunriseos>, 5 pages.

* cited by examiner

COMPOSABILITY FRAMEWORK FOR ROBOTIC CONTROL SYSTEM

BACKGROUND

This specification relates to frameworks for software control systems.

A software control system is a software system that controls the actions of physical devices, e.g., actuators or robots. Some software control systems are real-time software control systems that control real-time systems. A real-time software control system must execute its control routines within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

Such real-time software control systems are often used to control physical machines that have high precision and timing requirements. As one example, an execution environment of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position.

Due to such timing requirements, software control systems for physical machines are often implemented by closed software modules that are configured specifically for a highly-specialized tasks. For example, a robot that picks components for placement on a printed circuit board can be controlled by a closed software system that controls each of the low-level picking and placing actions. Often, the coordination of such software control modules follows an observe, plan, and act pattern that involves making a sensor observation, generating a plan, and then acting according to the plan.

SUMMARY

This specification describes a composability framework that supports the coordination of the low-level actions of multiple subsystems, which can include one or more real-time robots. In general, a framework is a library of software modules that provides some basic functionality for building an application in a particular execution environment. In this specification, the execution environment includes multiple subsystems that each have respective computing hardware. The framework provides mechanisms for asynchronous communication channels, discovery of low-level capabilities, and coordination between multiple independent devices. The techniques described below provide a framework for building applications that coordinate the multiple subsystems in the execution environment, each of which may have its own observe, plan, act functionality.

Particular embodiments of the subject matter described in this specification can be implemented so as to realize one or more of the following advantages.

Some existing robotics application frameworks dictate the interface of the devices and software modules, and do not allow a user to customize the interfaces for a particular use case. Some systems described in this application allow a user to compose generic low-level software modules to generate high-level software modules that fit their needs; users can also formulate the data interfaces of the software modules. Some such systems also allow high-level composability of software modules, where custom high-level software modules can themselves be further composed into higher-level software modules. Such higher-level software modules can establish communication channels between their respective constituent software modules, and can coordinate the execution of their respective constituent software modules.

Some systems described in this specification can also provide a discovery mechanism for the devices and software modules, whereby the devices and software modules declare their respective data interfaces upon user request. Thus, the systems provide a user-friendly management of the software modules by making it easy for users to invoke the software modules and retrieve their data interfaces. These systems can therefore be applied to a broad range of applications and a broad range of devices.

Some systems described in this specification allow users to establish communication channels between two or more devices. The communication channels can pass data between the devices, allowing the devices to execute one or more software modules asynchronously.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
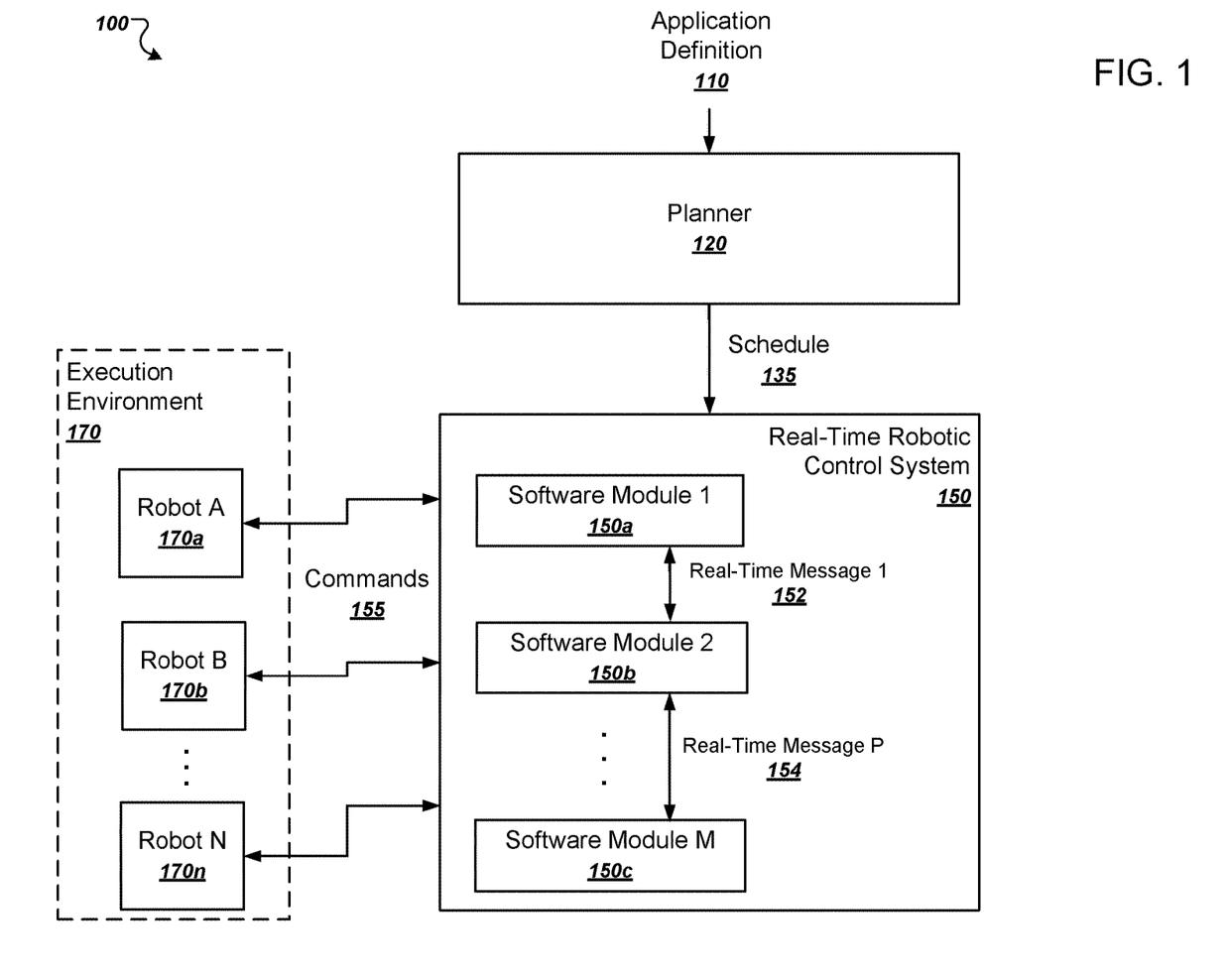
FIG. 1 is a diagram that illustrates an example system.

FIG. 1 is a diagram that illustrates an example system 100. The system 100 is an example of a system that can implement the techniques described in this specification.

The system 100 includes a number of functional components, including a planner 120 and a real-time robotic control system 150. Each of these components can be implemented as computer programs installed on one or more computers in one or more locations that are coupled to each other through any appropriate communications network, e.g., an intranet or the Internet, or combination of networks. The system 100 also includes an execution environment 170 that includes N robots 170a-n.

The real-time robotic control system 150 is configured to control the robots 170a-n in the execution environment 170. The real-time robotic control system 150 must satisfy one or more hard time constraints in the operation of the execution environment 170. For example, one of the robots in the execution environment 170 may be required to perform a certain operation at regular intervals, e.g. 10 milliseconds; if the robot ever fails to execute the operation in a given time window, then the robot enters a fault state.

The real-time robotic control system 150 is composed of one or more software module loops, each of which contains multiple software modules that execute repeatedly in a predetermined sequence in order to control the robots 170a-n. For simplicity, FIG. 1 shows a single software module loop that includes M software modules 150a-m. Each software module can execute one or more functions of a respective robot of the robots 170a-n.

Each software module can have a corresponding data interface that specifies the real-time data that the software module receives as input and provides as output. During execution, the software modules exchange P real-time messages 152a-p that are required for the respective software modules to execute. For example, software module 150a can provide real-time message 152a to software module 150b, and software module 150b can provide real-time message 152p to software module 150m.

The overall goal of the planner 120 is to generate a schedule 135 that allows the real-time robotic control system 150 to control the robots in the execution environment 170 in order to execute a certain task.

The planner 120 receives an application definition 110. The application definition 110 can be generated by a user. The application definition 110 can identify a particular task to be completed by the robots in the execution environment 170. To complete the task, the application definition 110 can specify a software module loop, including identifying the software modules 150a-m in the software module loop. The application definition 110 can also specify the real-time messages 152a-p exchanged between the software modules according to the data interfaces of the software modules.

Some of the software modules 150a-m can be high-level software modules composed of one or more lower-level software modules and a data interface, generated by the user using the lower-level software modules. That is, a custom high-level software module can depend on one or more low-level software modules.

The low-level software modules can execute basic functionality of a respective robot of the robots 170a-n. In some implementations, each low-level software modules depends on a custom software module that is customized for the respective robot. That is, the custom software module can execute a particular low-level functionality that is designed for the particular robot, e.g., that is tuned for the particular specifications of the particular robot. In some cases, a low-level software module can depend on a custom software module that is provided by the manufacturer of the robot; that is, the custom software module can be provided for users of the robot out-of-the-box.

Each software module can be associated with one or more of the robots in the execution environment 170; the software modules that a given device supports can be identified using a device interface definition. This process is discussed in more detail below in reference to FIG. 2 and FIG. 3.

The planner 120 uses the application definition 110 to generate a schedule 135 for the real-time robotic control system 150 to execute the software module loop to complete the particular task.

The planner 120 gives the schedule 135 to the real-time robotic control system 150, which executes the software module loop according to the schedule 135. That is, the real-time robotic control system 150 executes the software modules 150a-m, causing the real-time robotic control system 150 to issue commands 155 to the execution environment 170 in order to drive the movements of the robots 170a-n. While the software modules 150a-m are controlling the execution environment 170, the software modules 150a-m are exchanging real-time messages 152a-p.

Figure 2:
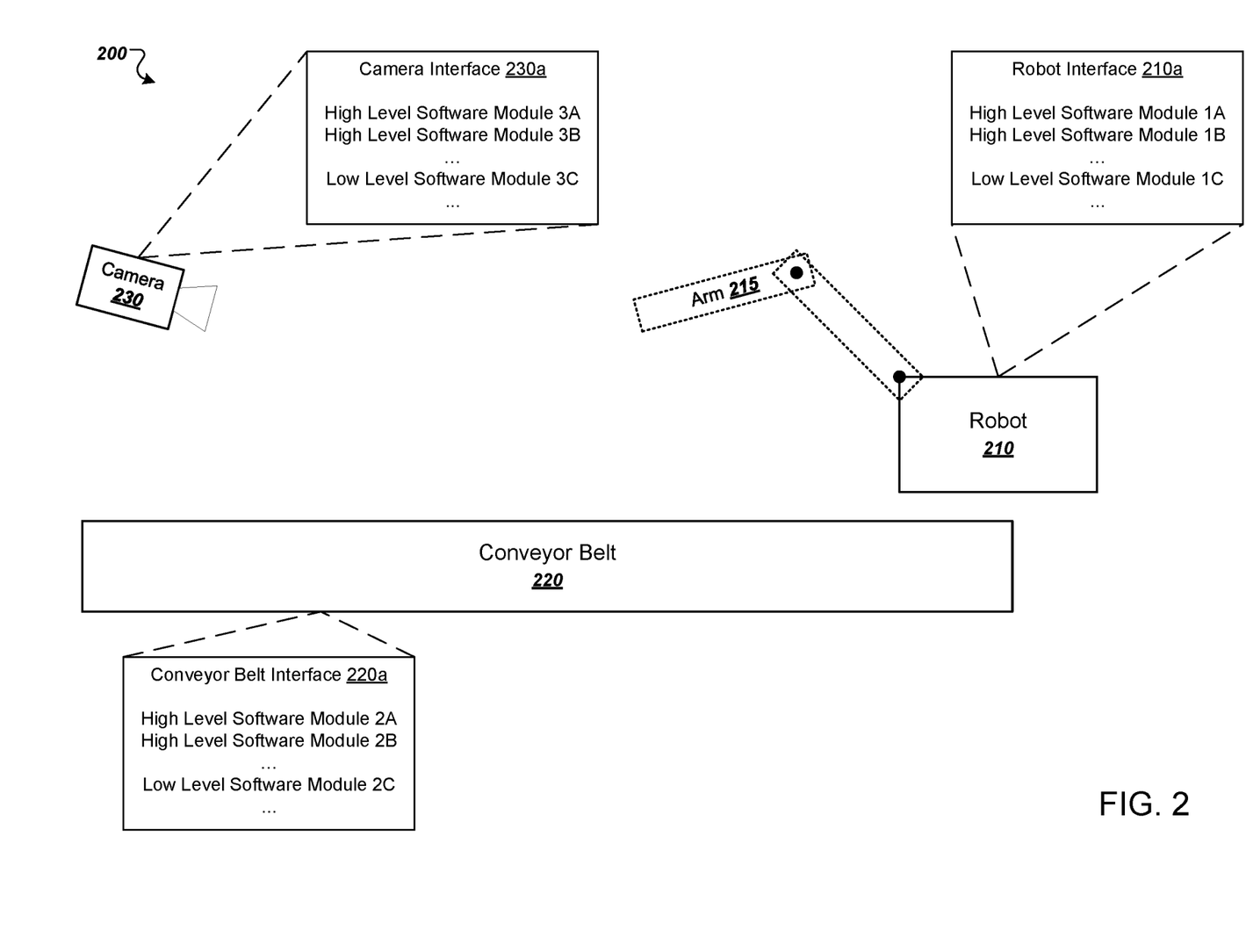
FIG. 2 illustrates an example execution environment with multiple devices.

FIG. 2 illustrates an example execution environment 200. The execution environment includes several robotic components, including a robot 210 with an arm 215, a conveyor belt 220, and a camera 230.

Each of the devices in the execution environment 200 has a device interface definition that declares what software modules the respective device can execute. For example, the robot 210 has a robot interface 210a that specifies a list of software modules that the robot can execute, including high-level software modules 1A and 1B, and a low-level software module 1C. Each high-level software module can be composed of one or more low-level software modules and/or one or more other high-level software modules. Composable software modules are described in more detail below in reference to FIG. 3.

Similarly, the conveyor belt 220 has a conveyor belt interface 220a that specifies a list of software modules that the conveyor belt can execute, and the camera 230 has a camera interface 230a that specifies a list of software modules that the camera can execute.

A user generating an application definition for the devices in the execution environment 200 to accomplish a particular task can use the device interface definitions 210a-c to determine the software modules that can be executed by the devices in the environment 200, and compose the available software modules to accomplish the task. As a particular example, the application definition can identify one or more software modules in the conveyor belt interface 220a that allow the conveyor belt 220 to move an object in front of the robot 210. The application definition can also identify one or more software modules in the robot interface 210a that allow the robot 210 to execute a pick-and-place of the object, where the arm 215 of the robot 210 moves the object from one position on the conveyor belt 220 to another position on the conveyor belt 220. Finally, the application definition can identify one or more software modules in the camera interface 230a that allow the camera to capture an image of the object after it has been moved by the robot 210 and use the image to confirm that the object is in a correct position. For example, a software module in the camera interface 230a might execute a machine learning perception algorithm that processes an image and generates a predicted pose of an identified object in the image. The application definition can specify that these software modules are to be executed iteratively in a software module loop; that is, the conveyor belt can move the object further down the line after its position has been approved, replacing it with a new object in the same location in front of the robot 210.

Each software module can also have a data interface that identifies how it can communicate with other software modules. For example, a software module in the conveyor belt interface 220a might send a real-time message to a software module in the robot interface 210a communicating that a new object has been moved in front of the robot 210. Data interfaces are discussed in more detail below in reference to FIG. 3.

An application definition that identifies software modules to be executed by the devices in the execution environment 200 can also specify that one or more of the software modules should be executed asynchronously. That is, a real-time robotic control system executing a plan generated from the application definition, e.g., the real-time robotic control system 150 depicted in FIG. 1, can launch a software module and perform other operations until it receives a callback that the software module has completed. For example, the real-time robotic control system can launch a first software module and a second software module in parallel. In some existing systems, when a software module is launched, the system must wait for the software module to be completed before continuing with any other operations. The ability to execute software modules asynchronously can be important because device actuation takes a large amount of time to execute from the perspective of a CPU, and thus a lot of time can be saved in a given iteration of a software module loop by executing multiple operations in parallel. For example, a joint move executed by the robot 210 in the execution environment 200 can take 3 seconds, which is a large amount of time in a real-time context.

Figure 3:
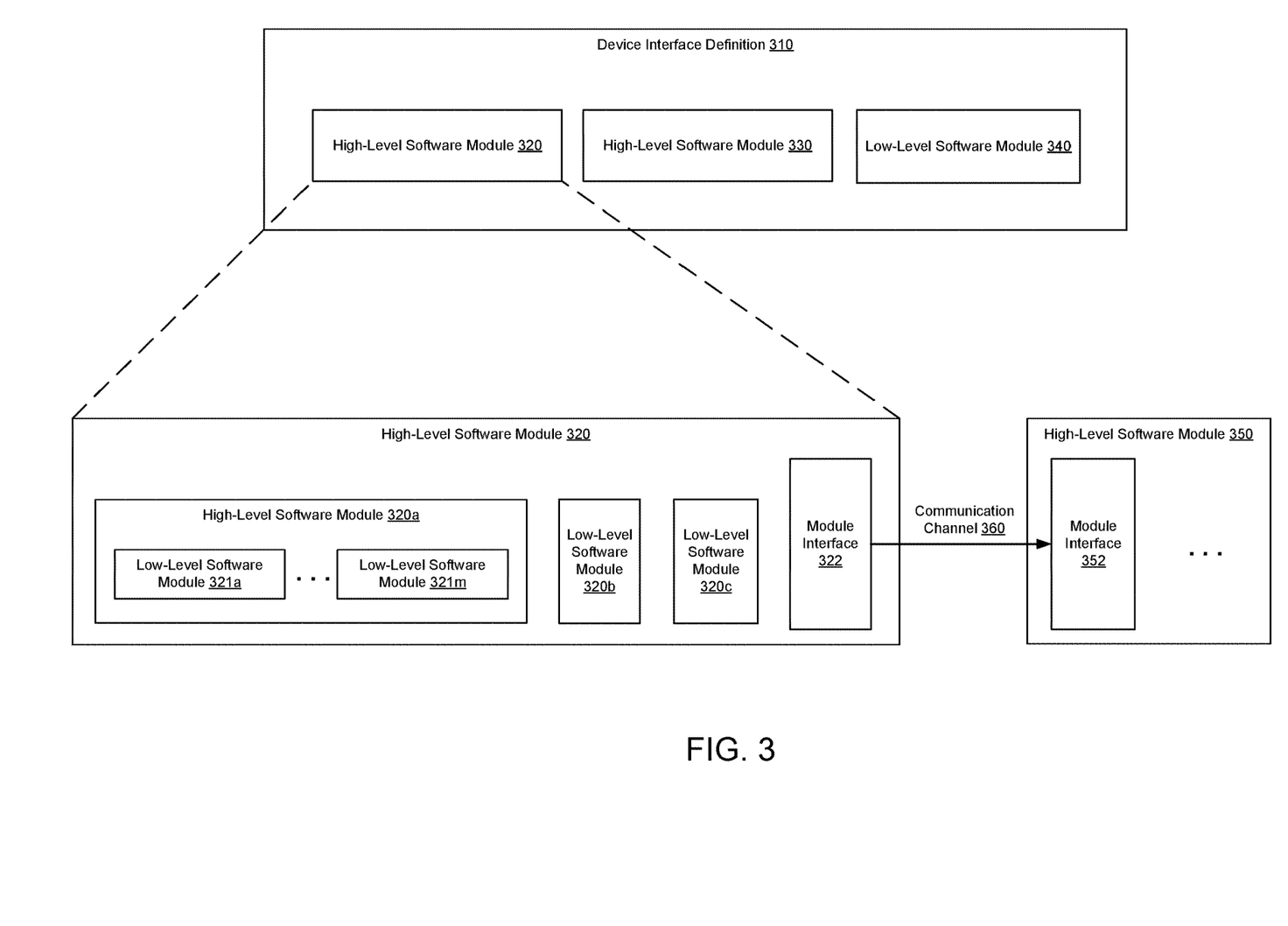
FIG. 3 illustrates an example device interface definition and example software modules.

FIG. 3 illustrates an example device interface definition 310 and example software modules 320 and 350.

The device interface definition 310 declares the software modules that a particular device or a particular group of devices can execute. For example, the particular device can execute high-level software modules 320 and 330, and a low-level software module 340. Each of the high-level software modules depend on one or more low-level software modules and/or one or more other high-level software modules. Each of the low-level software modules can execute basic functionality of the respective device. The high-level software module 320 is composed of a high-level software module 320a and low-level software modules 320b and 320c. That is, the operations executed by the high-level software module 320 include operations executed by the high-level software module 320a and the low-level software modules 320b and 320c, either sequentially or in parallel.

For example, the device interface definition 310 can be for a robotic arm, and the high-level software module 320 can execute a pick-and-place action, where the arm picks up an object in the execution environment, moves the object to a different location in the execution environment, and places the object down. The high-level software module 320a can execute a movement of the arm, the low-level software module 320b can execute a suction action of a suction gripper attached to the arm, and the low-level software module 320c can execute a de-suction action of the suction gripper attached to the arm. Thus, the high-level software module 320 can execute the pick-and-place by invoking the high-level software module 320a to move the arm into place over the object, the low-level software module 320b to pick up the object using the suction gripper, the high-level software module 320a again to move the object to a different location, and the low-level software module 320c to release the object using the suction gripper.

Similarly, the high-level software module 320a for moving the arm can be composed of M low-level software modules 321-m. For example, each of the low-level software modules 321a-m can execute a movement of the arm in a particular degree of freedom. As a particular example, a robotic arm may have 6 degrees of freedom, so a high-level software module for moving the arm may be composed of 6 low-level software modules, each of which control a particular degree of freedom.

The high-level software module 320 includes a module interface 322. The module interface specifies one or more communication channels by which the high-level software module 320 can either receive data as input or emit data as output. A communication channel can be internal, i.e. between two software modules executed by the same robot, e.g., between high-level software modules 320 and 330. A communication channel can also be external, i.e., between two software modules executed by respective different robots.

As a particular example, the module interface 322 can specify a communication channel 360 between the high-level software module 320 and another high-level software module 350 that is executed by a different robotic component. Similarly, the high-level software module 350 has a module interface 352 that specifies the communication channel 360.

In some cases, the communication channel 360 can be a hard real-time communication channel. That is, the communication channel 360 is configured to send data packets of a particular type from the high-level software module 320 to the high-level software module 350 continuously, e.g., every 10 ms or 100 ms. In some cases, the high-level software module 350 can enter an error state if the high-level software module 320 fails to send a data packet.

In some other cases, the communication channel 360 can be asynchronous. That is, the communication channel 360 is configured to send data packets of a particular type from the high-level software module 320 to the high-level software module 350 whenever the data packets are made available by the high-level software module 320. In other words, the high-level software module 320 generates the data packets at an irregular frequency, and therefore the high-level software module 350 receives the data packets at varying intervals. The high-level software module 350 can then execute a particular operation every time the high-level software module 320 sends a data packet.

The device interface definition 310 can also include a list of communication channels by which the device can receive input data or transmit output data. That is, the device interface definition 310 can declare the external communication channels of each respective software module in the device interface definition 310, where an external communication channel is a communication channel that a software module shares with another software module of a different device.

As a particular example, the device interface definition 310 can be for a camera in an execution environment, and the high-level software module 320 can execute a machine learning perception algorithm that processes an image of an object in the execution environment captured by the camera and generates an estimated pose of the object. Here, a pose of an object is data that characterizes the position and/or orientation of the object in the execution environment. The high-level software module 350 can execute a pick-and-place of the object by a robotic arm in the execution environment. The software module 350 may therefore need to know the pose of the object before picking the object up. The communication channel 360 can therefore send the estimated poses from the high-level software module 320 to the high-level software module 350 asynchronously, as they are generated by the high-level software module 320. The high-level software module 320 can interpolate the received estimated poses and, e.g., send the interpolated poses in real-time over another communication channel to another high-level or low-level software module.

In some cases, a communication channel specified by a module interface of a software module can be optional; that is, the software module can execute without the communication channel. In some other cases, a specified communication channel can be required.

The high-level software module 320 can be generated by a user. That is, a system can provide multiple low-level software modules that can be executed by one or more devices, as well as a tool for composing the low-level software modules to generate high-level software modules. For example, the system can provide a base class that each module interface of a high-level software module can inherit from, so that a user can easily design an arbitrary interface that specifies particular input channels and output channels. Thus, a user can generate a high-level software module that is specific to the particular use case of the user when such a high-level software module is not provided by a hardware manufacturer out of the box for a given device or group of devices.

In some implementations, the device interface definition 310 can be for a distributed system of devices. That is, the device interface definition 310 declares the software modules that can be executed by multiple devices across the distributed system, e.g., multiple computers or robots that are connected by communication channels. In these cases, the communication channels can allow software modules to execute asynchronous and real-time operations across the multiple devices.

Figure 4:
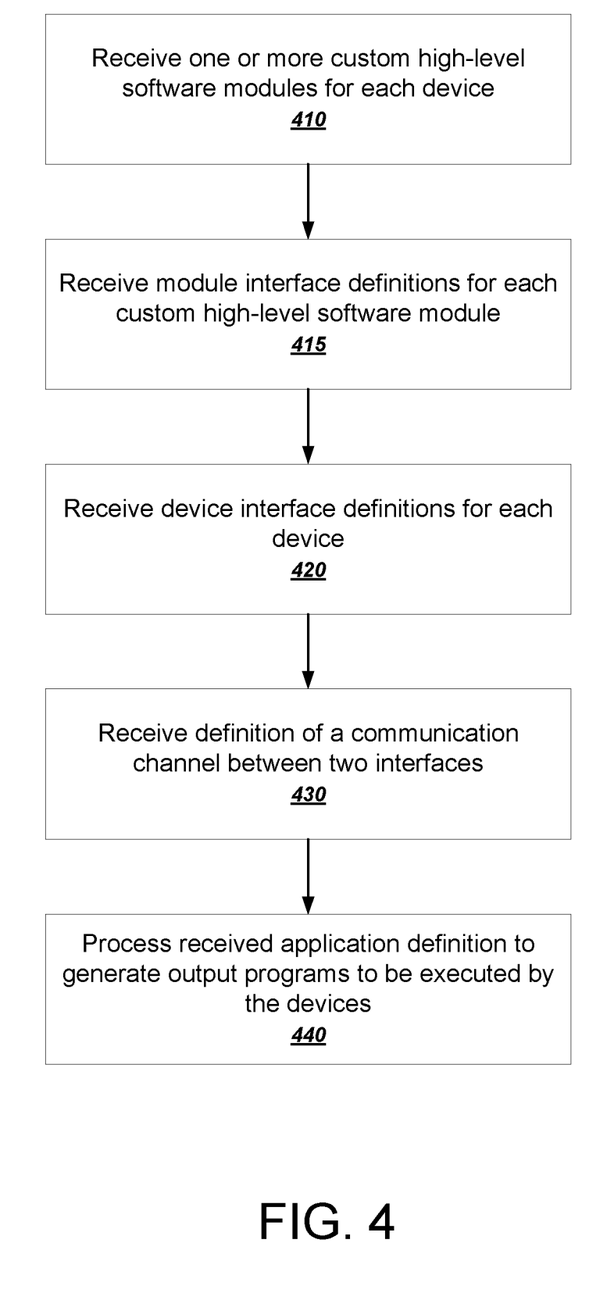
FIG. 4 is a flowchart of an example process for generating a program to be executed by one or more devices in an execution environment.

FIG. 4 is a flowchart of an example process 400 for generating a program to be executed by one or more devices in an execution environment. The process 400 can be implemented by one or more computer programs installed on one or more computers and programmed in accordance with this specification. For example, the process 400 can be performed by the planner 120 depicted in FIG. 1. For convenience, the process 400 will be described as being performed by a system of one or more computers.

The system receives one or more custom high-level software modules for each device in the execution environment (step 410). Some or all of the custom high-level software modules can include low-level software modules for a real-time robot.

The system receives module interface definitions for each of the custom high-level software modules (step 415). A module interface definition of a software module declares the module interface for the software module. In particular, the module interface definition of a custom high-level software module can specify one or more asynchronous or real-time communication channels through which the custom high-level software module can receive input data from a different custom high-level software module or transmit output data to the different custom high-level software module.

The system receives device interface definitions for each device in the execution environment (step 420). The device interface definition of a particular device can declare the software modules that the particular device can execute. A device interface definition of a particular device can also include one or more module interfaces for respective software modules that the particular device can execute. That is, if a software module has a module interface that specifies a particular communication channel with a different software module executed by a different device, then the device interface definition for the particular device can also specify the particular communication channel.

The system receives a definition of a communication channel between a first interface of a first device in the execution environment, and a second interface of a second device in the execution environment (step 430). In some cases, the execution of one or more software modules of the second device requires the information received through the communication channel, and therefore waits until receiving the information from the first device. That is, the communication channel can be asynchronous. As a particular example, the first device can be a real-time robot, and the information communicated on the channel can be a joint position of a joint of the real-time robot. As another particular example, the first device can be a camera, and the information communicated on the channel can be a pose of an object in the execution environment.

The received high-level software modules, device interface definitions, module interface definitions, and definition of the asynchronous channel can collectively be called an "application definition."

The system processes the received application definition to generate output programs to be executed by the devices (step 440). In some implementations, one or more of the output programs can be executed asynchronously.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to as motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g., a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving a multi-device application definition for a real-time robotic control system configured to perform operations comprising controlling a robotic execution environment having multiple robotic components, wherein the application definition comprises:
one or more custom high-level software modules for each robotic component of the multiple robotic components, wherein each custom high-level software module is configured to execute one or more functions of the robotic component, and wherein each custom high-level software module depends on one or more low-level software modules of the respective robotic component;
respective module interface definitions for each of the custom high-level software modules, wherein a module interface definition of a custom high-level software module specifies one or more asynchronous or real-time communication channels through which the custom high-level software module can receive input data from a different custom high-level software module or transmit output data to the different custom high-level software module; and
respective device interface definitions for each of the multiple robotic components, wherein a device interface definition of a robotic component declares the software modules that the robotic component can execute; and
processing the application definition to generate output programs to be executed respectively by the multiple robotic components, wherein the output programs comprise a plurality of commands to execute the one or more custom high-level software modules, and wherein a first output program for a first robotic component of the multiple robotic components causes the first robotic component to communicate information on a first communication channel to a second output program for a second robotic component of the multiple robotic components.

Embodiment 2 is the method of embodiment 1, wherein each low-level software module of a robotic component depends on a custom software module that is customized for the particular robotic component.

Embodiment 3 is the method of any one of embodiments 1 or 2, wherein the custom software module is provided by a manufacturer of the robotic component.

Embodiment 4 is the method of any one of embodiments 1-3, wherein the application definition specifies that the one or more high-level software modules of the second robotic component should wait on the information being received from the first robotic component.

Embodiment 5 is the method of any one of embodiments 1-4, wherein the first robotic component is a real-time robot, and wherein the information communicated on the first communication channel is a joint position of a joint of the real-time robot.

Embodiment 6 is the method of any one of embodiments 1-5, wherein the first robotic component is a camera, and wherein the information communicated on the first communication channel is a pose of an object in the execution environment.

Embodiment 7 is the method of any one of embodiments 1-6, wherein one or more of the output programs can be executed asynchronously.

Embodiment 8 is the method of any one of embodiments 1-7, wherein the device interface definition for each of the multiple robotic components comprises one or more module interface definitions of respective high-level software modules that the device can execute.

Embodiment 9 is the method of any one of embodiments 1-8, wherein the application definition further comprises a definition of a second communication channel between a first module interface of a first high-level software module of a third robot of the multiple robotic components, and a second module interface of a second high-level software module of the third robot.

Embodiment 10 is a system comprising: one or more computers and one or more storage devices storing instructions that are operable, when executed by the one or more computers, to cause the one or more computers to perform the method of any one of embodiments 1 to 9. Embodiment 11 is a computer storage medium encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising one or more computers and one or more storage devices storing instructions that are operable, when executed by the one or more computers, to cause the one or more computers to perform operations comprising:
receiving a multi-device application definition for a real-time robotic control system to execute a task, the real-time robotic control system being configured to perform operations comprising controlling a robotic execution environment having multiple robotic components, wherein the multi-device application definition comprises:
for each robotic component of the multiple robotic components, one or more respective custom high-level software modules, wherein:
each custom high-level software module is configured to execute one or more custom functionalities of the robotic component; and is composed at least in part by one or more low-level software modules of the robotic component, and
each low-level software module of the robotic component is configured to execute one or more base functionalities of the robotic component;
for each custom high-level software module, a respective module interface definition that specifies one or more asynchronous or real-time communication channels through which the custom high-level software module is configured to receive input data from a different custom high-level software module and/or transmit output data to a different custom high-level software module; and
for each robotic component of the multiple robotic components, a respective device interface definition that declares the software modules that the robotic component is configured to execute; and
processing the multi-device application definition to generate output programs to be executed respectively by the multiple robotic components, wherein the output programs comprise a plurality of commands to execute the one or more custom high-level software modules, and wherein a first output program for a first robotic component of the multiple robotic components causes the first robotic component to communicate information on a first communication channel to a second output program for a second robotic component of the multiple robotic components.

2. The system of claim 1, wherein at least one low-level software module of a particular robotic component of the multiple robotic components is or includes a software module that is provided by a manufacturer of the particular robotic component.

3. The system of claim 1, wherein the multi-device application definition specifies that at least one high-level software module of the second robotic component should wait on the information being received from the first robotic component before executing the custom functionalities of the at least one high-level software module.

4. The system of claim 1, wherein the first robotic component is a real-time robot, and wherein the information communicated on the first communication channel is a joint position of a joint of the real-time robot.

5. The system of claim 1, wherein the first robotic component is a camera, and wherein the information communicated on the first communication channel is a pose of an object in the execution environment.

6. The system of claim 1, wherein the real-time robotic control system is configured to execute one or more of the output programs asynchronously.

7. The system of claim 1, wherein, for each robotic component of the multiple robotic components, the device interface definition for the robotic component comprises one or more module interface definitions of respective high-level software modules that the robotic component is configured to execute.

8. The system of claim 1, wherein the multi-device application definition defines a second communication channel between a first high-level software module of a third robotic component of the multiple robotic components and a second high-level software module of the third robotic component.

9. A method comprising:
receiving a multi-device application definition for a real-time robotic control system execute a task, the real-time robotic control system being configured to perform operations comprising controlling a robotic execution environment having multiple robotic components, wherein the multi-device application definition comprises:
for each robotic component of the multiple robotic components, one or more respective custom high-level software modules wherein:
each custom high-level software module is configured to execute one or more custom functionalities of the robotic component and is composed at least in part by one or more low-level software modules of the robotic component, and
each low-level software module the robotic component is configured to execute one or more base functionalities of the robotic component;
for each custom high-level software module, respective module interface definition that specifies one or more asynchronous or real-time communication channels through which the custom high-level software module is configured to receive input data from a different custom high-level software module and/or transmit output data to a different custom high-level software module; and
for each robotic component of the multiple robotic components, a respective device interface definition that declares the software modules that the robotic component is configured to execute; and
processing the multi-device application definition to generate output programs to be executed respectively by the multiple robotic components, wherein the output programs comprise a plurality of commands to execute the one or more custom high-level software modules, and wherein a first output program for a first robotic component of the multiple robotic components causes the first robotic component to communicate information on a first communication channel to a second output program for a second robotic component of the multiple robotic components.

10. The method of claim 9, wherein at least one low-level software module of a particular robotic component of the multiple robotic components is or includes a software module that is provided by a manufacturer of the particular robotic component.

11. The method of claim 9, wherein the multi-device application definition specifies that at least one high-level software module of the second robotic component should wait on the information being received from the first robotic component before executing the custom functionalities of the at least one high-level software module.

12. The method of claim 9, wherein the real-time robotic control system is configured to execute one or more of the output programs asynchronously.

13. The method of claim 9, wherein, for each robotic component of the multiple robotic components, the device interface definition for the robotic component comprises one or more module interface definitions of respective high-level software modules that the robotic component is configured to execute.

14. The method of claim 9, wherein the multi-device application definition defines a second communication channel between a first high-level software module of a third robotic component of the multiple robotic components and a second high-level software module of the third robotic component.

15. One or more non-transitory computer storage media encoded with computer program instructions that when executed by a plurality of computers cause the plurality of computers to perform operations comprising:
receiving a multi-device application definition for a real-time robotic control system to execute a task, the real-time robotic-control system being configured to perform operations comprising controlling a robotic execution environment having multiple robotic components, wherein the multi-device application definition comprises:
for each robotic component of the multiple robotic components, one or more respective custom high-level software modules, wherein:
each custom high-level software module is configured to execute one or more custom functionalities of the robotic component and is composed at least in part by one or more low-level software modules of the robotic component, and
each low-level software module of the robotic component is configured to execute one or more base functionalities of the robotic component;
for each custom high-level software module, a respective module interface definition that specifies one or more asynchronous or real-time communication channels through which the custom high-level software module is configured to receive input data from a different custom high-level software module and/or transmit output data to a different custom high-level software module; and
for each robotic component of the multiple robotic components, a respective device interface definition that declares the software modules that the robotic component is configured to execute; and
processing the multi-device application definition to generate output programs to be executed respectively by the multiple robotic components, wherein the output programs comprise a plurality of commands to execute the one or more custom high-level software modules, and wherein a first output program for a first robotic component of the multiple robotic components causes the first robotic component to communicate information on a first communication channel to a second output program for a second robotic component of the multiple robotic components.

16. The non-transitory computer storage media of claim 15, wherein the multi-device application definition specifies that the at least one high-level software module of the second robotic component should wait on the information being received from the first robotic component before executing the custom functionalities of the at least one high-level software module.

17. The non-transitory computer storage media of claim 15, wherein the real-time robotic control system is configured to execute one or more of the output programs asynchronously.

18. The non-transitory computer storage media of claim 15, wherein, for each robotic component of the multiple robotic components, the device interface definition for the robotic component comprises one or more module interface definitions of respective high-level software modules that the robotic component is configured to execute.

19. The non-transitory computer storage media of claim 15, wherein the multi-device application definition defines a second communication channel between a first high-level software module of a third robotic component of the multiple robotic component and a second high-level software module of the third robotic component.

20. The non-transitory computer storage media of claim 15, wherein at least one low-level software module of a particular robotic component of the multiple robotic components is or includes a software module that is provided by a manufacturer of the particular robotic component.

* * * * *